United States Patent [19]

Djavairian et al.

[11] Patent Number: 5,325,632
[45] Date of Patent: Jul. 5, 1994

[54] COMPOSITE DOOR ASSEMBLY

[75] Inventors: David Djavairian, Rochester Hills; Richard B. Freeman, Oxford; Earl E. Kansier, Lake Orion; Jack J. Ritchie, Washington, all of Mich.

[73] Assignee: The Budd Company, Troy, Mich.

[21] Appl. No.: 964,376

[22] Filed: Oct. 21, 1992

[51] Int. Cl.5 .................................... B60J 5/04
[52] U.S. Cl. ...................... 49/502; 296/146.6
[58] Field of Search ............ 49/502, 374, 166, 501, 49/503; 296/146 B, 146 C, 901, 187

[56] References Cited

U.S. PATENT DOCUMENTS

| | | | |
|---|---|---|---|
| 2,198,069 | 4/1940 | Widman | 49/502 X |
| 2,807,498 | 9/1957 | Nelson | 49/502 |
| 3,782,036 | 1/1974 | Clark et al. | |
| 3,791,693 | 2/1974 | Hellriegel et al. | |
| 3,861,339 | 1/1975 | Aida et al. | |
| 3,862,490 | 1/1975 | Tsuneishi et al. | |
| 3,909,918 | 10/1975 | Takizawa et al. | |
| 3,909,919 | 10/1975 | Miyabayashi et al. | |
| 3,936,090 | 2/1976 | Aya et al. | |
| 4,056,280 | 11/1977 | Bauer et al. | |
| 4,196,929 | 4/1980 | Bauer | |
| 4,411,103 | 10/1983 | Ohmura et al. | 49/502 |
| 4,411,466 | 10/1983 | Koike | |
| 4,434,580 | 3/1984 | Engelsberger et al. | |
| 4,529,244 | 7/1985 | Zaydel | |
| 4,561,211 | 12/1985 | Raley et al. | |
| 4,597,153 | 7/1986 | Zaydel | |
| 4,648,208 | 3/1987 | Bawamus et al. | 49/502 |
| 4,651,470 | 3/1987 | Imura et al. | 49/502 |
| 4,662,115 | 5/1987 | Ohya et al. | |
| 4,711,052 | 12/1987 | Maeda et al. | 49/502 |
| 4,731,951 | 3/1988 | Ikuta et al. | |
| 4,831,710 | 5/1989 | Katoh et al. | |
| 4,843,762 | 7/1989 | Grier et al. | 49/502 X |
| 4,861,407 | 8/1989 | Volkmann et al. | |
| 4,945,682 | 8/1990 | Altman et al. | |
| 4,968,383 | 11/1990 | Volkmann et al. | |
| 5,033,236 | 7/1991 | Szerdahelyi et al. | 49/502 |
| 5,083,832 | 1/1992 | Ohya | 49/502 X |
| 5,090,158 | 2/1992 | Bertolini | 49/502 X |
| 5,095,659 | 3/1992 | Benoit et al. | 49/502 |

FOREIGN PATENT DOCUMENTS

| | | | |
|---|---|---|---|
| 57270 | 8/1982 | European Pat. Off. | 49/501 |
| 0128621 | 4/1984 | European Pat. Off. | |
| 7151427 | 9/1982 | Japan | 49/501 |
| 8600543 | 10/1987 | Netherlands | 49/501 |

Primary Examiner—Peter M. Cuomo
Assistant Examiner—Jerry Redman
Attorney, Agent, or Firm—Harness, Dickey & Pierce

[57] ABSTRACT

A vehicle door assembly including a tailored steel inner panel and an panel spaced apart by a belt-line reinforcement member. The tailored steel inner panel includes an intrusion beam which bridges first end and second ends of the inner panel.

21 Claims, 3 Drawing Sheets

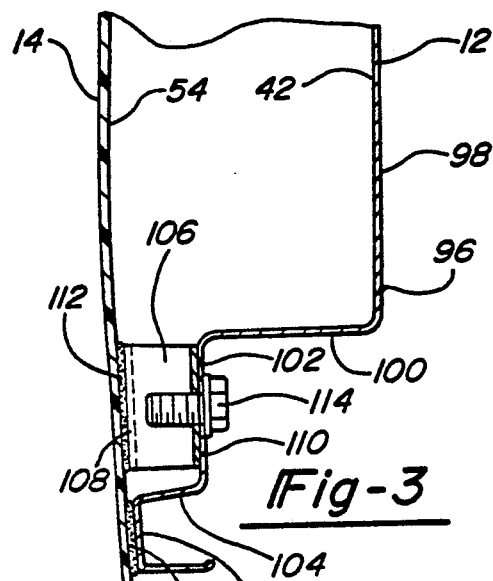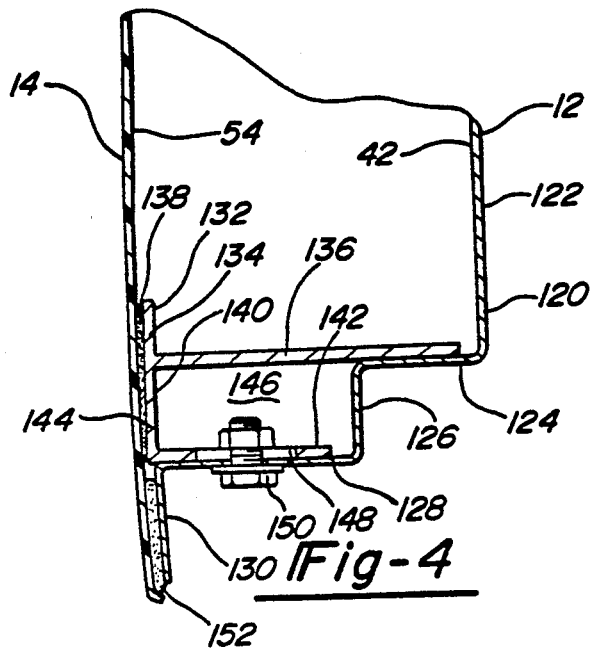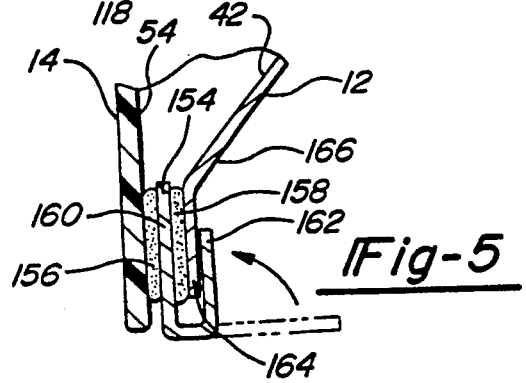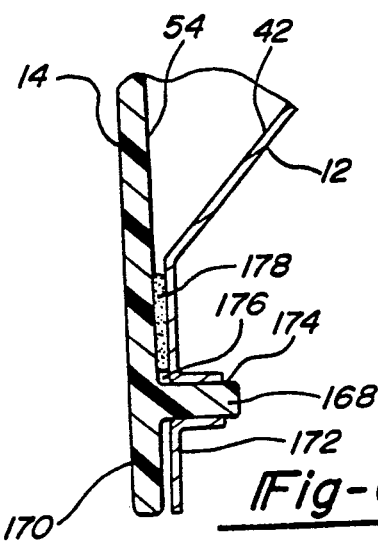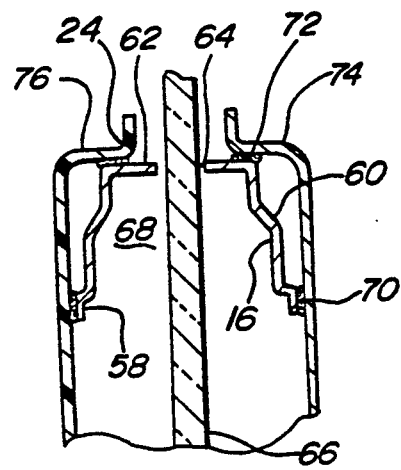

COMPOSITE DOOR ASSEMBLY

BACKGROUND OF THE INVENTION

1. Technical Field

This invention relates to a composite vehicle door structure and, more particularly, to a composite vehicle door structure including a tailored steel inner panel and a plastic outer panel wherein the panels are separated by a belt-line reinforcing member.

2. Discussion

In the automobile industry, it is desirable to limit the number of parts necessary to make various components. For example, most "conventional" vehicle door assemblies are generally constructed on an assembly line and involve close to 100 separate parts. These conventional door assemblies tend to be unnecessarily heavy and add significantly to the cost of the vehicle. The conventional door assembly usually includes a relatively thin inner panel formed by metal stamping, an outer panel of metal which is hemmed around the marginal edges of the inner panel and an intrusion beam extending longitudinally across the inner panels as major components. Often, it is necessary to further reinforce the inner panel along the side edges and proximate to the hinges because of the weight of the door assembly and the operational loads to which the door is subjected.

There are several problems associated with the conventional door assemblies and methods of manufacturing them. It is time consuming to require workers to assemble an excessive number of parts and then make sure the parts are properly aligned within the door structure itself. In order to allow sufficient time for the workers to property assemble the parts and position them within the door, the assembly line has to be run at a relatively slow speed. Due to the high number of parts, the cost of manufacturing the door assembly is higher than needed.

The present invention is directed to solving one or more of these problems.

SUMMARY OF THE INVENTION

The present invention is primarily concerned with greatly reducing the total number of parts necessary to make vehicle doors which are structurally sound, attractive, and easy to manufacture. In accordance with the teachings of the present invention, the composite vehicle door assembly has substantially fewer parts than conventional vehicle door assemblies. The composite vehicle door structure includes a tailored steel inner panel, a composite or plastic outer body panel, as well as a belt-line reinforcement member which separates the inner and outer door panels along the bottom edge of the window opening and an intrusion beam.

The tailored inner panel and plastic outer panel can be adhered together in various ways under the present invention. The belt-line reinforcing member is disposed between the inner and outer door panels to enhance the shock absorbing characteristics of the vehicle door during a collision. The reinforcing member also provides for proper spacing between the inner and outer door panels.

One of the advantages of the present invention, therefore, is a decrease in the unit cost of the vehicle door. By reducing the number of parts which make up the vehicle door structure and the assembly of parts, the amount expended for producing the vehicle door structure, as well as labor costs, will be reduced.

Another advantage of the present invention is a reduction inventories and inventory costs.

Yet another advantage of the present invention is a reduction in the weight of the vehicle door structure. This translates into better fuel efficiency which, in turn, means cost savings to the consumer.

It is still another advantage of the present invention to provide an improved reinforcing construction of a vehicle door which has the ability to absorb or distribute deformation loads which result from collisions.

BRIEF DESCRIPTION OF THE DRAWINGS

The various advantages of the present invention will become apparent to those skilled in the art after having the benefit of reading the following specification and by reference to the drawings in which:

FIG. 1a is a top view of the belt-line reinforcement of FIG. 1.

FIG. 3 is a simplified cross-sectional view which illustrates a first method of bonding the plastic outer panel to the steel inner panel according to the teaching of the present invention;

FIG. 4 is a simplified cross-sectional view which illustrates a second method of bonding the plastic outer panel to the steel inner panel according to the teachings of the present invention;

FIG. 5 is a simplified cross-sectional view which illustrates a third method of bonding the plastic outer panel to the steel inner panel according to the teachings of the present invention;

FIG. 6 is a simplified cross-sectional view which illustrates a fourth method of bonding the plastic outer panel to the steel inner panel according to the teaching of the present invention; FIG. 7a is a simplified cross-sectional view which illustrates a fifth method of bonding the plastic outer panel to the steel inner panel according to the teachings of the present invention;

FIG. 7b is an enlarged sectional view further illustrating the method according to FIG. 7a;

FIG. 8 is a simplified cross-sectional view illustrating a method of attaching the belt-line reinforcement member between the inner and outer door panels.

DETAILED DESCRIPTION OF THE PREFERRED EMBODIMENT

Figure 1:
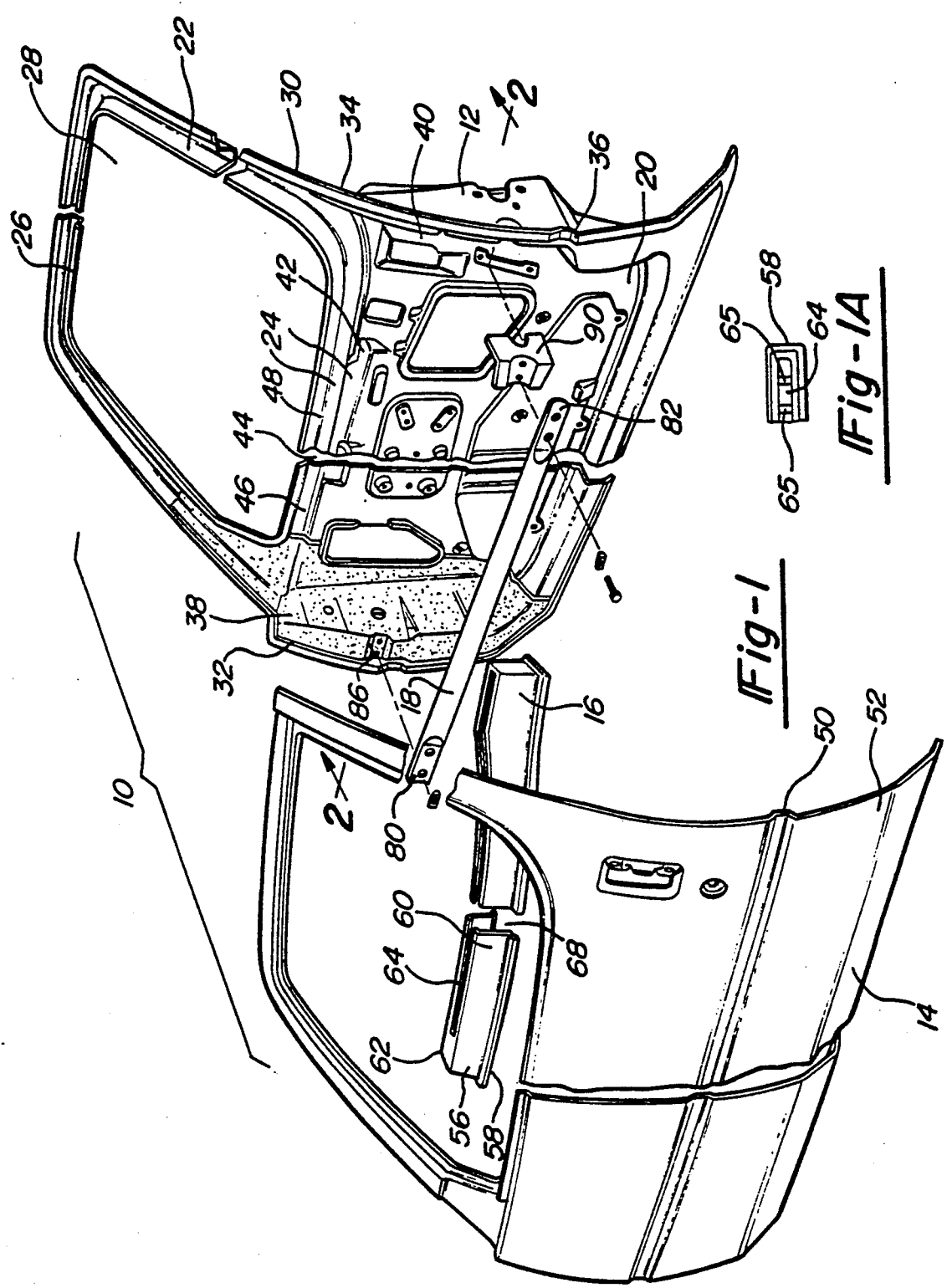
FIG. 1 is an exploded perspective view of the door structure made in accordance with the teaching of the present invention.

As eluded to earlier, the methods and apparatus of the present invention are concerned with providing a vehicle door assembly 10 having a tailored steel inner panel 12, a plastic outer panel 14, a belt-line reinforcing member 16 which separates the inner and outer panels along the lower edge of the window frame and an intrusion beam 18. Much of the focus of this invention is directed to the tailored steel inner panel 12. The inner panel 12, which is formed by stamping galvanized sheet metal to define a shape corresponding to that of the door opening in the vehicle with which it will be used, has a body including a lower generally rectangular portion 20 and a upper generally trapozidal portion 22. The intersection of the upper and lower portions is commonly referred to as the belt-line 24. During formation of the steel inner panel additional steel reinforcement is provided along the laterally extending leading end 38 to increase the structural rigidity of the inner door panel 12. This additional steel reinforcement is accomplished generally by tailoring the inner door panel. Tailoring occurs by providing two or more separate inner door panel sections then aligning and joining them to form a single inner door panel. The sections may be combined in any suitable manner, but preferably are joined by laser welding. As demonstrated in FIG. 1, the laser weld would occur along the fissure 44 where the first and second door panel sections 46 and 48, respectively, are combined. It should be noted however that the tailoring may occur at various points along the inner panel and in one embodiment (not shown) the tailoring occurs along the lateral portion where the additional steel reinforcement and the thinner portion inner panel section converge.

Below the belt-line, the inner panel is typically provided with a plurality of openings for access to the internal mechanisms such as window regulators and door latches (not shown) which are disposed within the vehicle door between the inner and outer panels. Above the belt-line, the trapezoidal portion includes the window frame 26 and a window opening 28. The periphery of the inner panel 12 is provided with an edge portion 30 which provides an area for attachment to the outer panel 14. Optionally, a pair of detents 36 may be provided along the leading and trailing edges 32 and 34, respectively, for hosting the inwardly projecting trim strip track 50 of the outer panel 14.

The outer door panel 14 which preferably is formed of a sheet molded compound (SMC) is provided for attachment to the inner panel. The outer door panel 14 includes an outer surface 52 which is exposed to the environment and an inner surface 54 which mates with peripheral edge 30 of inner panel 12.

Disposed between the inner and outer panels and located along the belt-line 24 is a belt-line reinforcement member 16 as shown in FIGS. 1 and 8. According to a preferred embodiment of the present invention, the belt-line reinforcement member is a one-piece construction made from rigid fiber-reinforced plastic or steel having an overall rectangular shape. The belt-line reinforcement member includes a hollow body portion 56 having a first section 58 which forms an annular shoulder extending radially outwardly from the body portion and located along the bottom edge for attachment to the inner and outer door panels 12 and 14, respectively. Body portion 56 also includes a second section 60 which extends between the first portion 58 and the transversely disposed top surface 62. The top surface 62 is provided with a slot 64 for allowing the window 66 to pass therethrough when the window 66 is in an at least partially closed position as demonstrated in FIG. 8. In one embodiment one or more spacers 65 as shown in FIG. 1a extend across the slot to maintain the opening during assembly and are thereafter removed by trimming or punching them out after the door is assembled. Attachment of the belt-line reinforcement member to the inner and outer panels is typically accomplished through the use of an adhesive 70 which is applied to both the inner and outer panels. The adhesive allows the annular shoulder 58 to be bonded to both the inner surface 42 of the inner panel 12 and the inner surface 54 of the outer panel 14. A second amount of adhesive 72 is used to secure the top surface 62 to the incurved portions of the inner and outer panels 70 and 72, respectively. A channel 68 which is located below the top surface of the belt-line reinforcement member and within the body portion 56 is provided for receiving the window. Although the belt-line reinforcement member of FIGS. 1 and 8 is utilized to maintain spacing and improve structural rigidity between the tailored steel inner panel 12 and a composite outer panel 14, it will be understood by those skilled in the art that the belt-line reinforcement member of the present invention can be effectively utilized in door embodiments made of other materials as well. Optionally, it may be desirable to provide the belt-line reinforcement member with a collar (not shown) extending upwardly from the top surface and around the aperture for added window guidance.

Figure 2:
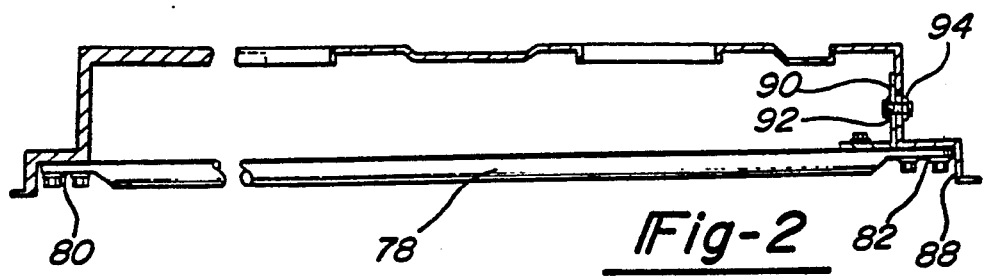
FIG. 2 is a simplified cross-sectional view taken along lines 2—2 of FIG. 1 which illustrates the intrusion beam and tailoring of the inner door panel according to the present invention.

An intrusion beam assembly 18 is provided for reinforcing the door assembly and absorbing impact forces in the event of a collision. The intrusion beam 78 is formed of a relatively rigid metal and includes a first end 80 and a second end 82. In the embodiment of FIGS. 1 and 2, the first end is secured within a recess 86 located proximate to the leading edge 32 of the inner panel 12 and the second end is secured within a recess 88 located proximate to the trailing edge 34 of the inner panel 12. A brace 90 is attached near the second end 82 of the beam 78. The brace 90 includes a slot 92 which provides for a slip plain to adjust the intrusion beam when necessary and is attached to the inner door panel by a nut and bolt assembly 94. The brace provides additional support to the intrusion beam. Securement of the intrusion beam can also be accomplished by other suitable fastening means such as by a system known as TOG-L-LOC (a trademark of BTM Corp. of Marysville, Mich.) wherein the sheet metal is punched into conforming engagement. Upon securing the intrusion beam 78, the beam extends across the lower portion 20 of the inner door panel between the leading end 38 and the second, laterally extending trailing end 40 thereby bridging the tailored and non-tailored portions of the inner door panel 12. The intrusion beam assembly of the present invention is of a high strength construction and involves fewer parts than other known intrusion beam assemblies which directly results in a desirable weight reduction for the door assembly 10.

Referring to FIGS. 3 through 7b various methods of joining the tailored steel inner panel 12 and the composite or plastic outer panel 14 according to the teachings of the present invention are illustrated. Reference numerals for the inner panel 12, inner surface 42, outer panel 14, and surface 54 are utilized for each of the FIGS. 3 through 7b.

With specific reference to FIG. 3 the tailored steel inner panel 12 is shown to include a frame 96 having contoured end 104 for attachment to outer panel. The frame includes a body 98, a transitional step 100 and an extending portion 102 leading to the end portion 104. The extending portion 102 is spaced apart from the inner surface 54 of the outer panel 14 to provide sufficient space for bracket member 106. In the present embodiment a plurality of spaced apart brackets 106 are utilized to assist in securing the inner and outer panels together. The brackets are U-shaped in cross-section having a first leg 108 and a second leg 110. The first leg 108 of the bracket 106 is secured to the inner surface 54 of the outer panel 14 by an adhesive 112 and the second leg 110 is attached to the frame 88 by a bolt 114 or another suitable fastener. The end 104 of the frame 96 is substantially C-shaped in cross-section and includes a back 116 disposed substantially parallel to the inner surface 54 of the outer panel 14 such that an adhesive 118 may be disposed between the back 116 and the inner surface 54 of the outer panel to further secure the inner and outer panels together.

Referring to FIG. 4 another method of adjoining a tailored steel inner panel 12 and a composite or plastic outer panel 14 according to the teachings of the present invention is illustrated. In this embodiment the steel inner panel includes a frame 120 having a body portion 122, a first transitional step 124 extending in the direction of the outer panel, an outwardly extending section 126, a second transitional step 128 extending from said outwardly extending section in the direction of the outer panel and a distal portion 130 disposed substantially parallel to the inner surface of the outer panel. The inner panel is designed to allow for the use of a plurality of spaced apart brackets 132 to assist in securing the steel inner panel to the outer panel. The brackets 132 have an overall L-shape including a first leg 134 which is attached to the inner surface 54 of the outer panel 14 along a first surface 138 by an adhesive 144 and a second leg 142 which is mechanically attached to the frame 120 along the second transitional step 128. The first leg 134 also includes an arm 136 extending transversely from the inner surface 140 of the first leg 134. The end of the arm 136 partially overlaps the first transitional portion 124 to align the bracket 132 within the gap 146 which occurs between the frame and the outer panel. The second leg 142 is provided with a slot 148 which allows for adjustment of the outer panel relative to the inner panel prior to tightening the nut and bolt fastening assembly 150 which is disposed through the slot. A second amount of adhesive 152 is then inserted between the distal portion 130 of the frame and the inner surface 54 of the outer panel 14 to further secure the inner and outer panels together.

Referring to FIG. 5 yet another method of attaching the tailored steel inner panel 12 to the composite or plastic outer panel 14 according to the teachings of the present invention is shown. In this embodiment a plurality of spaced apart steel strip 154 are attached to the inner surface 54 of outer panel 14 by an adhesive 156 and to the outer surface 42 of the inner panel 12 by a second amount of adhesive 158 along a first end 160 of the strip. Once the adhesives cure sufficiently the second end 162 of the steel strip 154 is bent to a substantial U-shape to hem the strip around the edge 164 of the inner panel 12. An additional amount of adhesive (not shown) may also be disposed on the surface 166 of the inner panel edge 164 to further adhere the steel strip 154 to the inner panel. Depending upon the manufacturers specifications one long steel strip or a plurality of shorter steel strips may be utilized to carry out this method of attaching the tailored steel inner panel to the composite or plastic outer panel.

Referring to FIG. 6 yet another method of adjoining the tailored steel inner panel 12 and a composite or plastic outer panel 14 according to the teachings of the present invention is shown. Under this embodiment the outer panel 14 is provided with a plurality of spaced apart post members 168 located proximate to the outer panels edge 170 and extending from the inner surface 54 thereof in the direction of the steel inner panel 12 to facilitate attachment of the inner and outer door panels. The inner panel 12 is provided with an edge portion 172 which includes a plurality of apertures 174 for receiving the corresponding post members 168. After the inner and outer panels have been aligned such that the post members 168 and apertures 174 are in mating engagement the panels are brought together. The adhesive 178 which was previously disposed within the gap 176 located between the inner and outer panel edge portions is then allowed to cure to permanently secure the inner and outer panels together.

Figures 7A, 7B:
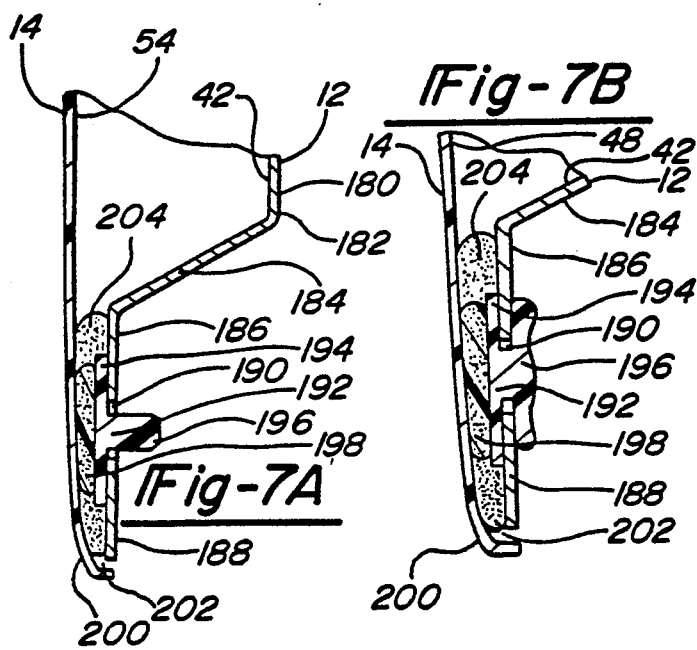

Referring to FIGS. 7a and 7b still another method of attaching the steel inner panel 12 and a composite or plastic outer panel 14 according to the teachings of the present invention is illustrated. According to this embodiment the steel inner panel 12 is provided with a frame portion 180 having a body 182, a transitional portion 184 and an edge portion 188 having a plurality of spaced apart apertures 190 extending therethrough. The outer door panel 14 is provided with a plurality of spaced apart thermoplastic tabs 192 adhesively bonded to the outer panel by an adhesive 198 along the edge 200 of the outer panels inner surface 54. The plastic tabs 192 include a head portion 194 and a nipple 196 which is sufficiently long to extend through the corresponding aperture 190. Upon adjoining the inner and outer panels such that the nipples 196 extend through the apertures 190 the plastic tabs 192 are heated to a temperature sufficient to cause the nipple to melt and expand laterally to initially lock the steel inner panel and the outer panel together. This melting of plastic tabs may be referred to as "heat staking". Typically, there is a slight gap between the plastic tab and aperture to accommodate this expansion. A second adhesive 204 is then disposed between the gap 202 provided for between the edge portions 188 and 200, respectively, of the inner and outer panels to further secure the inner and outer panels together.

Figure 9:
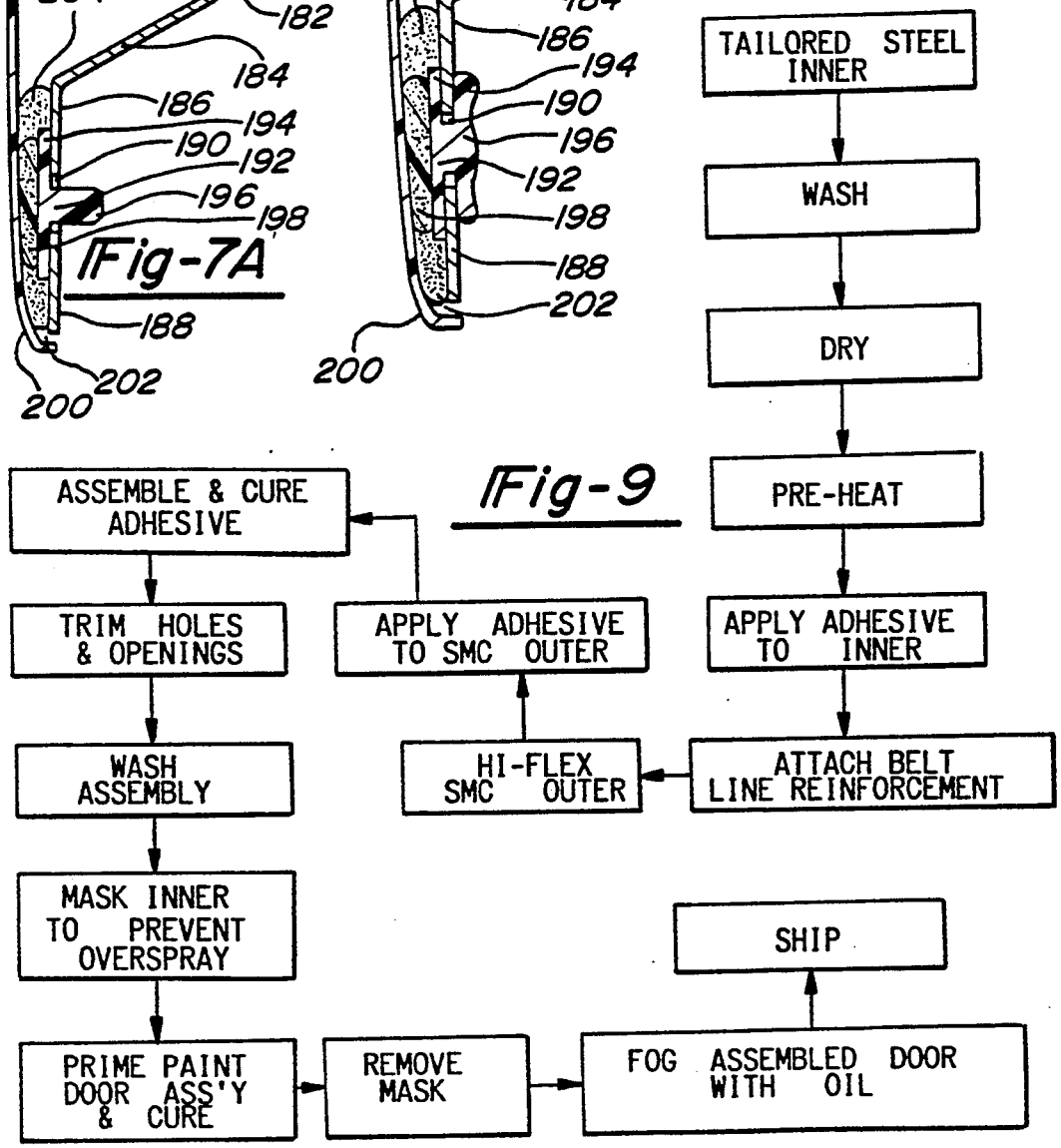
FIG. 9 is a schematic diagram illustrating a method of manufacturing the composite vehicle door assembly of the present invention.

FIG. 9 illustrates a method of manufacturing the composite vehicle door assembly 10 of the present invention. The tailored steel inner panel 12 along with the attached intrusion beam is washed in a suitable solvent, dried and then optionally preheated prior to receiving a desirable amount of adhesive. The adhesive is applied to the inner surface of the steel inner panel along the belt-line and peripheral edges. The belt-line reinforcement member is then attached to the inner surface of the inner door panel. Once the belt-line reinforcement member has been adhesively attached to the inner surface of the tailored steel inner panel an additional amount of adhesive is applied to the inner surface of the outer panel along the belt-line. The inner and outer panels are then brought together to adhesively attach the inner surface of the outer panel to the belt-line reinforcement member and adjoin the inner and outer panels to form the door assembly. The adhesive applications are allowed to cure to secure belt-line reinforcement and the inner and outer panels together. The excess material extending into the openings and slots provided on the belt-line reinforcement member and the on inner panel are then trimmed away. The entire assembly is then washed and the inner panel is provided with a mask to prevent overspray during painting. With the mask in place a primer paint is applied to the door assembly and allowed to cure. The protective mask is then removed and the door assembly is fogged by dipping or spraying the door assembly in oil to prevent rusting. After fogging the assembled door is ready to be shipped.

While the methods disclosed with reference to FIGS. 3 through 7b having been specifically directed to adjoining a tailored steel inner panel and a composite or plastic outer panel it should be understood that the methods of attachment are considered to be applicable to inner and outer door panels made of other materials as well.

In view of the foregoing, it can now be appreciated that the composite vehicle door assembly and methods relating to the assembly thereof provide significant advantages over conventional door structures. Among these advantages is a significant reduction in weight and overall assembly time. Still other advantages will become apparent to those skilled in the art after having the benefit of a study of the specification, drawings, and following claims.

We claim:

1. A vehicle door comprising:
    an outer panel;
    a metal inner panel having first and second laterally extending ends, said metal inner panel having a tailored portion which is tailored along the first laterally extending end to provide reinforcement;
    an intrusion beam assembly secured to said inner panel along said tailored portion and the second laterally extending end; and
    means for connecting said inner and outer panels.

2. The door of claim 1, further comprising a belt-line reinforcing member separate from the inner and outer panels which spaces said inner and outer panels, said belt-line reinforcing member including a hollow body, a transversely disposed top surface having a slot therethrough for receiving a window and an annular shoulder.

3. The door of claim 2, wherein at least one removable spacer extends across said slot to maintain the opening.

4. The door of claim 2, wherein said belt-line reinforcement member is formed from fiber reinforced plastic.

5. The door of claim 1, wherein said intrusion beam assembly includes an intrusion beam having a first end attached directly to said inner panel along said inner panel's first end and a second end which is attached to said inner panel along said inner panel's second end by a brace which extends from said inner panel.

6. The door of claim 5, wherein said intrusion beam is formed from steel.

7. The door of claim 1, wherein said means for connecting said inner and outer panels include an adhesive disposed between contiguous portions of said inner and outer panels.

8. The door of claim 7, wherein said means for connecting said inner and outer panels further includes mechanical fastening means.

9. The door of claim 8, wherein said mechanical fastening means includes at least one bracket member mechanically fastened to said inner panel and adhesively attached to said outer panel.

10. The door of claim 9, wherein said bracket member has an overall U-shape including a first leg which is mechanically connected to said inner panel and a second leg which is adhesively bonded to said outer panel.

11. The door of claim 9, wherein said at least one bracket member is formed from a metal.

12. The door of claim 9, wherein said bracket member has an overall L-shape including a first leg which is adhesively attached to said outer panel along one surface and a second leg which is mechanically connected to said inner panel.

13. The door of claim 12, wherein said first leg includes an arm extending transversely from a second surface which partially overlaps a second portion of said inner panel to position said bracket.

14. The door of claim 12, wherein said second leg is provided with a slot for adjusting the outer panel relative to the inner panel prior to tightening the mechanical fastening means.

15. The door of claim 8, wherein said mechanical fastening means includes a metal strip adhesively attached to said inner and outer panels and hemmed over the edge of said inner panel.

16. The door of claim 8, wherein said mechanical fastening means for connecting said inner and outer panels include tabs having a head and an extending selectively deformable thermoplastic nipple portion.

17. The door of claim 1, wherein said outer panel is formed from a composite or plastic material.

18. A belt-line reinforcing member for a vehicle door including inner and outer panels and a retractable window, comprising:
    a one piece structure disposable between and separate from the inner and outer panels of the vehicle door, the structure including a hollow body and a top disposed substantially transversely to the body, said top having a slot therethrough for receiving the window and through which the window extends when said window is in at least partially closed position.

19. The belt-line reinforcing member of claim 18, further comprising an annular shoulder extending radially outwardly from the body.

20. The belt-line reinforcing member of claim 18, where the inner and outer panels each include an upper incurved portion, said top of the body being affixed to the incurved portions, and wherein sides of the body are affixed to interior portions of the panels beneath said top.

21. The belt-line reinforcement member of claim 20, wherein the body is made of fiber reinforced plastic and is affixed to the door panels by an adhesive.

* * * * *